(12) United States Patent
Giebels et al.

(10) Patent No.: US 7,177,714 B2
(45) Date of Patent: Feb. 13, 2007

(54) METHOD AND APPARATUS FOR DETERMINING AND REPRESENTING CONTINUOUS RESOURCE LOADING PROFILES AND OVERLOAD PROBABILITY FUNCTIONS FOR COMPLEX DISCRETE MANUFACTURING

(75) Inventors: Mark Mathieu Theodorus Giebels, Berkeley, CA (US); Daniel Conrad Benson, Berkeley, CA (US)

(73) Assignee: Siemens Technology-to-Business Center, LLC, Berkeley, CA (US)

( * ) Notice: Subject to any disclaimer, the term of this patent is extended or adjusted under 35 U.S.C. 154(b) by 0 days.

(21) Appl. No.: 11/083,807

(22) Filed: Mar. 18, 2005

(65) Prior Publication Data

US 2006/0079982 A1 Apr. 13, 2006

Related U.S. Application Data

(60) Provisional application No. 60/614,131, filed on Sep. 28, 2004.

(51) Int. Cl.
*G06F 19/00* (2006.01)
(52) U.S. Cl. ...................................... 700/99
(58) Field of Classification Search ........... 700/99–102
See application file for complete search history.

(56) References Cited

U.S. PATENT DOCUMENTS

2005/0107904 A1* 5/2005 Mikata ....................... 700/121

OTHER PUBLICATIONS

Giebels, "EtoPlan: A Concept for Concurrent Manufacturing Planning and Control: Building holarchies for manufacture-to-order environments", PrintPartners Ipskamp B.V. (2000).*
Vijayan, Jaikumar, "Manufacturing Execution Systems", Computerworld, Jul. 31, 2000. [Retrieved Oct. 28, 2004] Retrieved from Internet: URL: < http://www.computerworld.com/printthis/2000/0,4814,47639,00.html > 3pgs.
Govil M K et al: Queuing Theory in Manufacturing Systems, Society of Manufacturing Engineers, Dearborn, MI, US vol. 18, No. 3, 1999, pp. 214-240, XP004182932, ISSN: 0278-6125.
Miragliotta G, et al.: "Decentralized, Multi-Objective Driven Scheduling for Re-Entrant Shops: A Conceptual Development and a Test Case" European Journal of Operational Research, Amsterdam, NL, vol. 167, No. 3, Sep. 1, 2004, pp. 644-662, XP004750786, ISSN: 0377-2217.

(Continued)

*Primary Examiner*—Leo Picard
*Assistant Examiner*—Ryan A. Jarrett (57) ABSTRACT

A method of analyzing a manufacturing system. The manufacturing system includes a plurality of manufacturing resources. A set of orders is currently appointed for processing by the manufacturing system. Each order of the set of orders requires performance of at least one task. Each task is to be performed by at least a respective one of the manufacturing resources. The method includes determining stochastic parameters for each task of the plurality of tasks. The method also includes calculating a loading profile for at least one of the manufacturing resources that is allocated to at least one of the plurality of tasks. The loading profile function is a function of time and represents a probability that the manufacturing resource is occupied at a given time. The calculation is based at least in part on the stochastic parameters of the tasks.

6 Claims, 10 Drawing Sheets

OTHER PUBLICATIONS

Brennan R W, et al.: "Evaluating the Performance of Reactive Control Architectures for Manufacturing Production Control" Computers in Industry, Elsevier Science Publishers. Amsterdam, NL, vol. 46, No. 3, Oct. 2001, pp. 235-345, XP004308499, ISSN: 0166-3615.

Somlo J: "Suitable Switching Policies for FMS Scheduling" Mechatronics, Pergamon Press, Oxford, GB, vol. 14, No. 2., Mar. 2004, pp. 199-225, XP004464009, ISSN: 0957-4157.

* cited by examiner

METHOD AND APPARATUS FOR DETERMINING AND REPRESENTING CONTINUOUS RESOURCE LOADING PROFILES AND OVERLOAD PROBABILITY FUNCTIONS FOR COMPLEX DISCRETE MANUFACTURING

CROSS-REFERENCE TO RELATED APPLICATION

This application claims priority under 35 U.S.C. § 119 to U.S. Provisional Patent Application Ser. No. 60/614,131, entitled "Method for Future Diagnostics and Decision Support for Order-Based Discrete Manufacturing", filed in the name of Giebels et al. on Sep. 28, 2004, the contents of which are hereby incorporated by reference in their entirety for all purposes.

BACKGROUND

The present disclosure relates to complex discrete manufacturing environments, and in particular to the determination and representation of resource loading profiles.

Resource loading analysis for complex discrete manufacturing is the process of determining future resource requirements in view of the scheduled production tasks for a current order mix. Complex discrete manufacturing refers to manufacturing to produce a relatively large number of orders of different kinds, where a significant number of orders require a considerable number of production tasks. "Resources" may include machine tools or other equipment required to perform production tasks, as well as operators of such equipment. For a given set of orders to be produced, resource loading analysis may produce an estimate of the amount of work required over a period of time from each resource and group of resources in the factory.

Complex discrete manufacturing environments are rather unpredictable because of uncertainty and variability in production processes. Conventional resource loading analysis deals with uncertainty and variability by segmenting the time period of interest into "time buckets" and estimating the average load for each bucket. The preferable duration of the time buckets depends on the degree of variability. The greater the variability, the longer the necessary duration of the time buckets in order to produce reliable results. However by using time buckets for resource loading analysis, peaks in loads on resources may be concealed, thereby possibly failing to indicate resource overloads. Thus, the only way to prevent overloads when time-bucket-based resource loading analysis is performed is to create excess and/or flexible capacity. But excess capacity may reduce efficiency, and it is often impossible to provide flexible resource capacity.

SUMMARY

Apparatus and methods are therefore presented for a system to analyze a manufacturing system.

According to some embodiments, a method, a system and an article of manufacture that includes a computer usable medium containing computer readable program code are provided to analyze a manufacturing system. The manufacturing system includes a plurality of manufacturing resources. A set of orders is currently appointed for processing by the manufacturing system. Each order of the set of orders requires performance of at least one task. Each task is to be performed by at least a respective one of the manufacturing resources. The system to analyze the manufacturing system includes a processor and a memory that is coupled to the processor and stores software instructions. The method steps and/or the steps performed by the processor and/or the steps called for by the computer readable program code include determining stochastic parameters for each task of the plurality of tasks, and calculating a loading profile function for at least one of the manufacturing resources that is allocated to at least one of the plurality of tasks. The loading profile function may be a function of time and may represent a probability that the manufacturing resource in question is occupied at a given time. The calculation is based at least in part on the stochastic parameters of the tasks.

An order may be considered to be "appointed" for processing by the manufacturing system when the order has (a) been received, or (b) it is anticipated that the order will be or may be received.

"Determining a stochastic parameter" refers to calculating the stochastic parameter and/or receiving data that represents the stochastic parameter.

In some embodiments, a graphic display page is displayed, and includes a graph curve that represents the loading profile function. In some embodiments, an overload probability function is calculated for each manufacturing resource and the graphic display page includes a graph curve that represents the overload probability function.

Further aspects of the instant system will be more readily appreciated upon review of the detailed description of the preferred embodiments included below when taken in conjunction with the accompanying drawings.

DETAILED DESCRIPTION OF SPECIFIC EMBODIMENTS

According to some embodiments, continuous resource loading profiles are determined for a given set of resources, resource groups, and production tasks in a dynamic manufacturing environment. Resource loading refers to the loading of a set of production tasks on resources such as machines, tools and operators. The resource loading profiles may also be presented to the user in the form of curves on a graph in a screen display. The graphic presentation may aid in allowing for improved planning of manufacturing jobs, and in particular may aid planners in coping with variability and uncertainty.

In contrast to time-bucket resource loading analysis, the present invention uses stochastic models to represent the uncertainty and variability that are inherent in complex discrete manufacturing environments. For example, the stochastic profile that may be provided for a given resource may represent the probability that one or more tasks are executed on that resource at a particular time.

Incorporating uncertainty and variability in the model increases the accuracy and resolution of the resulting resource loading profile. In addition, since the stochastic distribution is a continuous curve, the profile may be represented to the user in the form of a continuous graph. The resulting resource loading profiles and the continuous graph representation may provide more accurate and reliable information concerning the expected resource loading for the entire set of resources over the given order mix. This in turn may lead to a better informed and improved decision making process, and may allow for improved and early detection of problems, and earlier plan adjustments to address problems. The resource loading profiles and graphical representation of the present invention may also promote improved resource allocation and balancing, and may allow last minute troubleshooting to be avoided.

Figure 1:
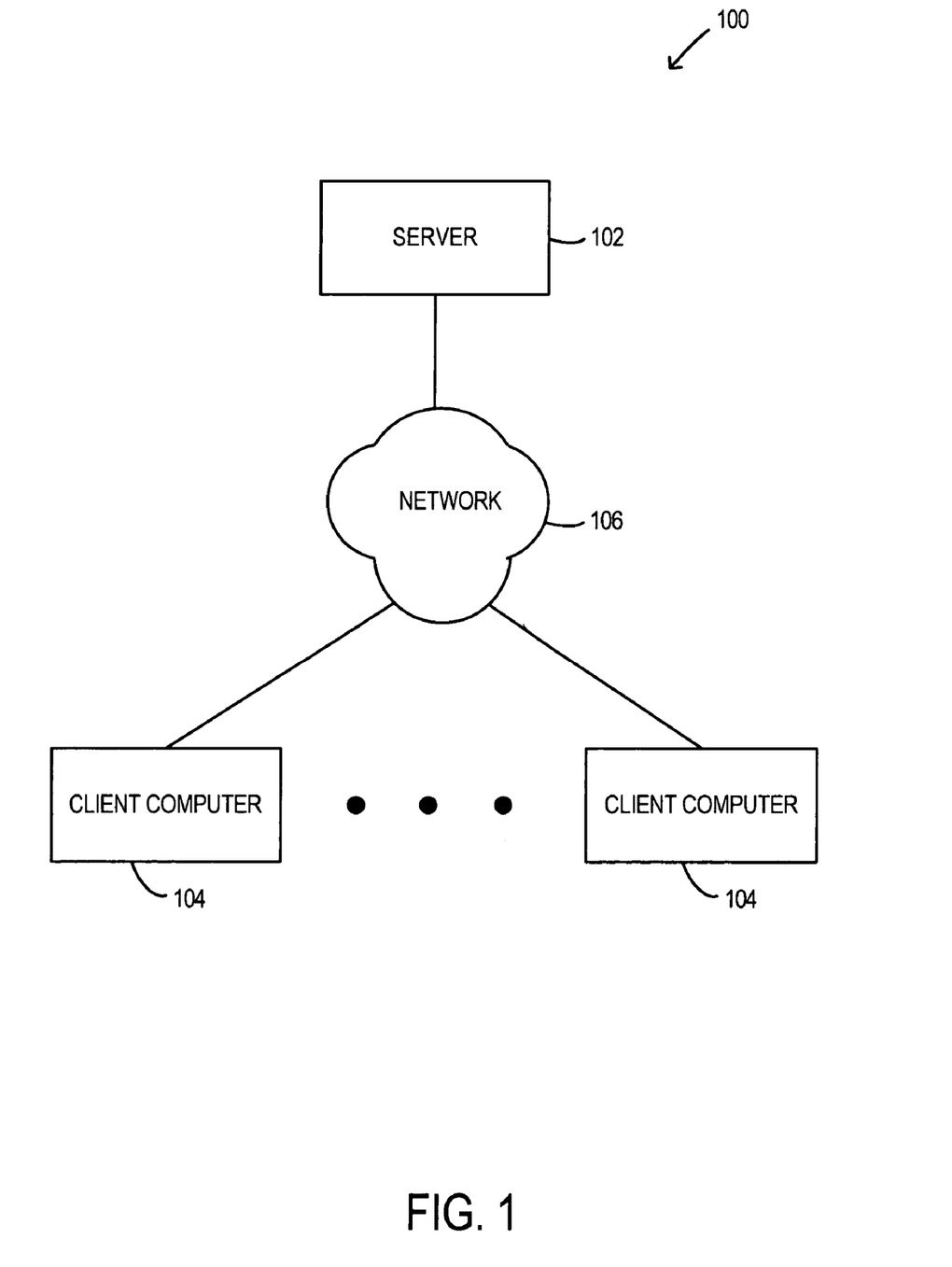
FIG. 1 is a block diagram of a data processing system provided according to some embodiments.

FIG. 1 is a block diagram of a data processing system 100 provided according to some embodiments. The data processing system 100 includes a server computer 102 and one or more client computers 104 coupled to the server computer 102 via a data communication network 106. In its hardware aspects, the data processing system 100 may be entirely conventional. Moreover, the data communication protocol by which data is exchanged between the server computer 102 and the client computers 104 may also be conventional. The data communication between the server computer 102 and the client computers 104 need not be continuous but rather may be intermittent or occasional.

Figure 2:
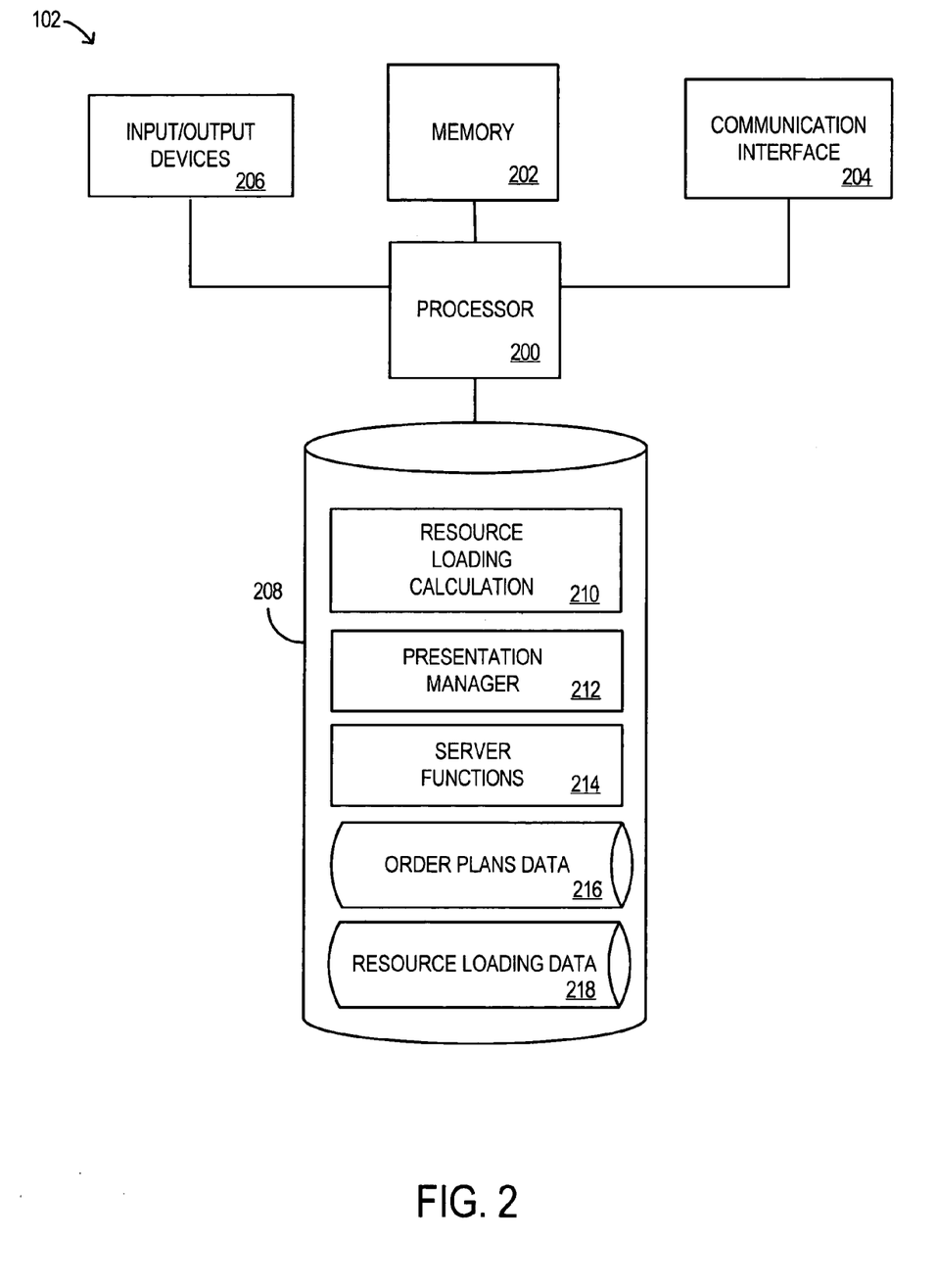
FIG. 2 is a block diagram of a server computer that is provided according to some embodiments as part of the data processing system of FIG. 1.

FIG. 2 is a block diagram of the server computer 102 as provided in accordance with some embodiments. As suggested above, the server computer 102 may, in some embodiments, be entirely conventional in terms of its hardware aspects. As discussed below, software may be provided to control the server computer 102 in accordance with aspects of the present invention, and data may be stored and manipulated in the server computer 102 in accordance with aspects of the present invention.

The server computer 102 may include one or more processors 200, which may be a conventional microprocessor or microprocessors. Also included in server computer 102 are memory 202, one or more communication interfaces 204, and input/output devices 206, all of which are in communication with the processor 200. The memory 202 may be, in some embodiments, one or more of RAM, ROM, flash memory, etc., and may serve as one or more of working memory, program storage memory, etc. The communication interfaces 204 allow the server computer 102 to exchange data with the client computers 104 (FIG. 1). The I/O devices 206 may include one or more conventional devices such as displays, printers, keyboards, a mouse, a trackball, etc.

Also included in the server 102, and in communication with the processor 200, is a mass storage device 208. Mass storage device 208 may be constituted by one or more magnetic storage devices, such as hard disks, one or more optical storage devices, and/or solid state storage. The mass storage 208 may store an application 210 which controls the server computer to perform resource loading calculations and related calculations in accordance with principles of the present invention. The mass storage 208 may also store an application 212 which manages viewable presentation of the resource loading profiles and related information. The mass storage 208 may also store software 214 which enables the server computer 102 to perform its server functions relative to the client computers. In addition, other software, which is not represented in the drawing, may be stored in the mass storage 208, including operating system software and/or other applications that allow the server computer 102 to perform other functions in addition to the resource loading analysis described below.

Still further, the mass storage 208 may store order planning data 216 and resource loading data 218.

The order planning data 216 may be received, at least in part, from a production scheduling system, which is not shown. The production scheduling system may reside on the server 102 or on another server (not shown) with which the server 102 is in data communication. The order planning data 216 may also result in part from a dynamic-state waiting time analysis such as that described in co-pending U.S. patent application Ser. No. 11/083,825, filed concurrently, entitled "Dynamic-State Waiting Time Analysis Method for Complex Discrete Manufacturing", which has common inventors and a common assignee herewith and the contents of which are hereby incorporated by reference in their entirety for all purposes.

The following Table 1 provides details of certain aspects of the data which was described above, as may be provided in accordance with some embodiments.

| Object | Parameter | Abbreviation | Description | Stochastic Characteristics |
|---|---|---|---|---|
| Task | Expected Start Time | EXST | The time the production task is expected to start | Any distribution or a deterministic value may be used |
| Task | Processing Time | PR | The expected total time a production task occupies its allocated machine tool(s) | Any distribution or a deterministic value may be used |
| Task | Lead Time | LT | The expected time period between the start and end times of a production task | Any distribution or a deterministic value may be used |

| Object | Parameter | Abbreviation | Description | Stochastic Characteristics |
| --- | --- | --- | --- | --- |
| Task | Task Resource Allocations | TRA | The set of resources allocated to execute a given production task. | The chance of actually using one of the resources from this set for executing the production task may be included. |
| Resource | Resource Availability | RA | The expected availability of a resource for production at a given time | Function (time) |
| Operator | Operator Availability | OA | The expected availability of an operator for production at a given time | Function (time) |

The resource loading data 218 may be generated by the resource loading analysis described below.

Figure 3:
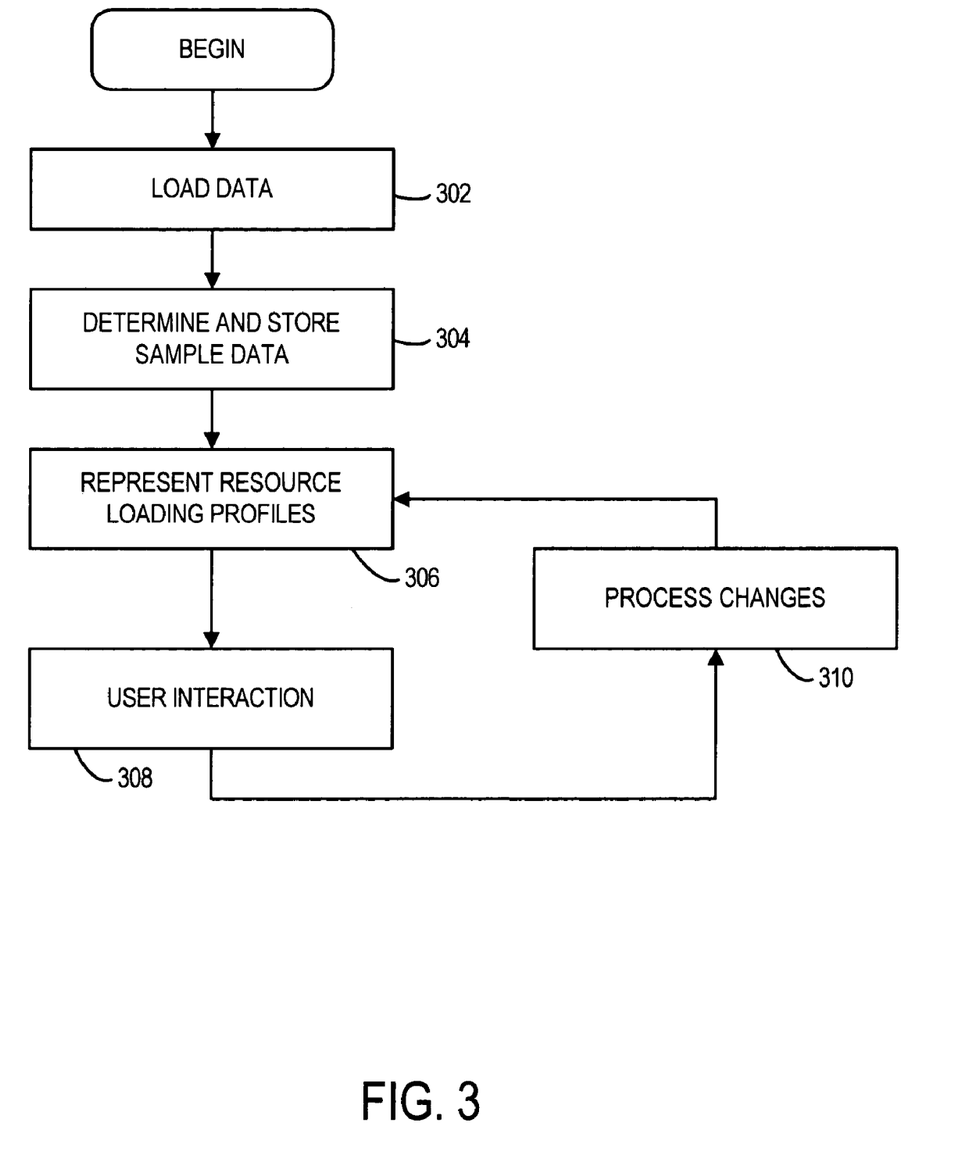
FIG. 3 is a high-level flow chart that illustrates a process for performing resource loading analysis according to some embodiments.

FIG. 3 is a high-level flow chart that illustrates a process for performing resource loading analysis according to some embodiments.

At 302 in FIG. 3, stochastic data about production tasks and resource availability is loaded into the system. This data may be of the types illustrated above in Table 1.

At 304, the data loaded at 302 is used to determine and store sample values for the resource loading profiles. As will be seen, the resource loading profiles may be derived from master data objects. To allow this derivation to be performed efficiently, sample values may be stored in accordance with the data storage structure shown in FIG. 4.

Figure 4:
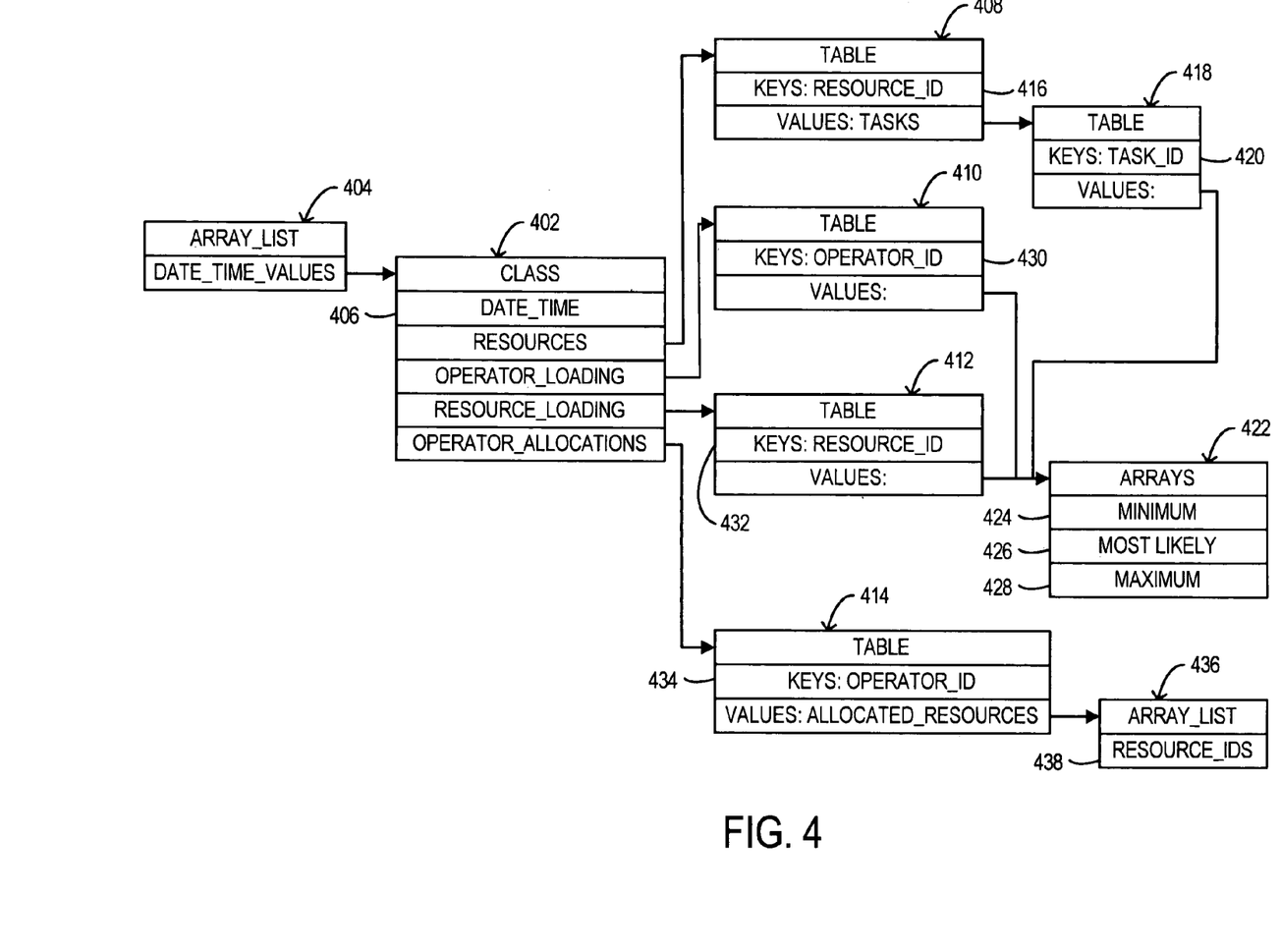
FIG. 4 is a diagram that illustrates a data storage structure that may be used in connection with the resource loading analysis process of FIG. 3.

The time period for the analysis may be subdivided into constant time intervals of, say, one hour. For each interval, an instantiation of the Date_Time_Value class 402 may be stored in the Date_Time_Value array list 404.

The Date_Time_Value class may have the following attributes: (a) a Date_Time value 406 that indicates the date and time of the sample time; (b) a Resources array 408 which stores the contribution of each task to the utilization of the resources at the sample time; (c) a Resource_Loading array 412 which stores the utilization estimates for each resource at the sample time; (d) an Operator_Loading array 410 which stores the utilization estimates for each operator at the sample time; and (e) an Operator_Allocations array 414 which stores the resource(s) that each operator is allocated to during the sample time. In some embodiments, the arrays 408–414 may be implemented by instantiating a known object class such as the "hashtable" object class.

The Resources array 408 uses resource identifiers (Resource_IDs) 416 as keys and has Task arrays 418 as values. The Task arrays 418 store the contribution of each task to the loading profile of the identified resource. The task array 418 may also be implemented by instantiating a known object class such as the "hashtable" object class.

The Task arrays 418 use Task identifiers (Task_IDs) 420 as keys and have arrays 422 as values. In some embodiments, the arrays 422 may be so-called double precision arrays. The arrays 422 store the estimated contributions of the identified task to the loading profile of the identified resource.

Each array 422 stores three loading contribution estimates: a minimum estimate 424, a most likely estimate 426, and a maximum estimate 428. These values reflect the lower bound, the mode, and the upper bound probabilities, respectively of the distribution density function that is employed.

The Operator Loading array 410 uses operator identifiers (Operator_IDs) 430 as keys and has arrays 422 as values to store estimates of the loading profile for the identified operator.

The Resource Loading array 412 uses resource identifiers 432 as keys and has arrays 422 as values to store estimates of the loading profile for the identified resource.

The Operator_Allocations array 414 uses operator identifiers 434 and has array lists 436 as values. The array lists 436 store the resource identifiers 438 for the resources that the identified operator is allocated to.

Figure 5:
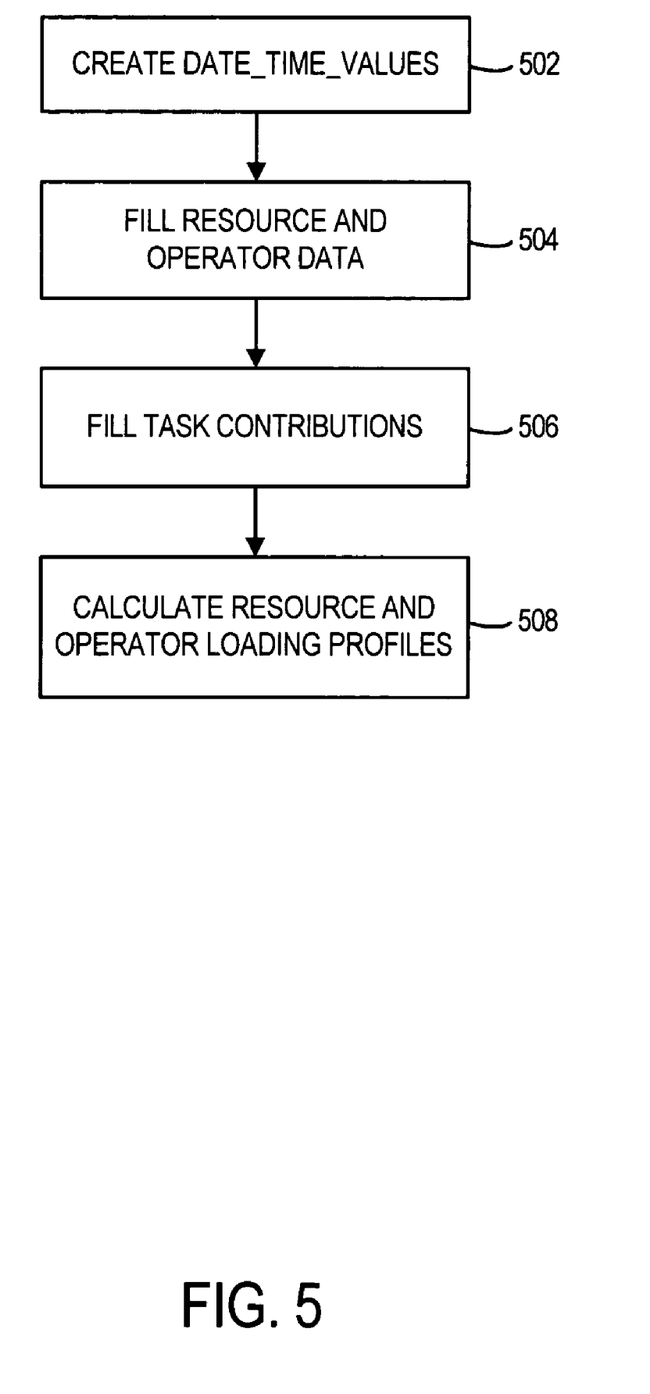
FIG. 5 is a flow chart that illustrates some details of the process of FIG. 3.

FIG. 5 is a flow chart that illustrates details of the process of storing the Date_Time_Value objects 402 (part of step 304 of FIG. 3). At 502, an instantiation of the Date_Time_Value class is created for each time interval from the beginning of the analysis period (which typically is the present time) to the end of the analysis period, and each instantiation is stored in Date_Time_Value array list 404.

At 504, the Date_Time_Value objects 402 are filled with resource and operator data by performing the following steps with respect to each Date_Time_Value object:

(A) For all resources included in the analysis, the resource identifier 416 or 432 is added as a new key to the Resources array 408 and the Resource_Loading array 412.

(B) For all operators included in the analysis and available for production activities in the given time interval, the operator identifier 430 or 434 is added as a new key to the Operator_Loading array 410 and the Operator_Allocations array 414.

(C) For each operator included in the Operator_Allocations array 414, a new array list 436 is created and added as a value in the entry of the Operator_Allocations array 414 for the operator in question. Then, the resources to which the operator is allocated in the given time period are added to the array list 436.

At 506, the Date_Time_Value objects 402 are filled with data that represents the estimated contributions of the tasks to the loading profiles for the references and the operators. This is done by calculating and storing the estimated contributions for each Date_Time_Value object according to the following steps.

(A) A set S is defined which consists of all tasks that have a probability greater than zero of being in production at the date and time which correspond to the Date_Time_Value object currently being filled. That is, for each task the function $$g(t) = \frac{PR_{mean} \cdot (F_{EXST}(t) - F_E(t))}{LT_{mean}}$$

is evaluated for the date and time in question.

For this function,

PR$_{mean}$ is the mean value of the processing time of the given task,

LT$_{mean}$ is the mean value of the lead time of the given task,

F$_{EXST}$(t) is the chance that the production of the given task has started at time t, F$_E$(t) is the chance that the production of the given task has ended at time t, with the distribution function of the end time defined by E=EXST+LT E, EXST and LT are all stochastic probability distributions functions.

In the case of each of the parameters PR and LT, the mean value may be calculated as the arithmetic mean of the minimum, maximum and most likely values of the parameter.

Each task for which g(t) is greater than zero is included in set S.

(B) For each task included in set S, there are calculated the minimum, maximum and most likely probabilities that the task will be in production at the time and date for the Date_Time_Value object currently being filled. The minimum probability is calculated by evaluating the following function at the time and date in question:

$$g\_min(t) = \frac{PR_{min} \cdot (F_{EXST}(t) - F_E(t))}{LT_{mean}},$$

where PR$_{min}$ is the minimum value of the processing time for the given task. The most likely probability is calculated by evaluating the following function at the time and date in question:

$$g\_most\_likely(t) = \frac{PR_{most\_likely} \cdot (F_{EXST}(t) - F_E(t))}{LT_{mean}},$$

where PR$_{most\_likely}$ is the most likely value of the processing time for the given task. The maximum probability is calculated by evaluating the following function at the time and date in question:

$$g\_max(t) = \frac{PR_{max} \cdot (F_{EXST}(t) - F_E(t))}{LT_{mean}},$$

where PR$_{max}$ is the maximum value of the processing time for the given task.

(C) For each task T in set S, the following is performed for each resource allocated to the task T: The probabilities calculated in step (B) immediately above are multiplied by the probability of allocation of the resource in question to the task T. The resulting values are stored in the table 408 for the resource in question as values in the Task array 418 for the task T.

At 508 in FIG. 5, the loading profiles for the resources and operators are calculated and stored in accordance with the following steps, which are performed with respect to each instantiation of the Date_Time_Value class:

(A) For each resource listed in Resource array 408, the values for the tasks listed in Task arrays 418 are summed, and the resulting sum values are stored in the Resource_Loading array 412 for the resource in question.

(B) For each operator, a set R is defined consisting of all resources that are allocated to the operator in question for the date and time value that is currently being processed.

(C) For each operator, each value of the Resource_Loading array 412 for a resource in set R is divided by the number of operators the resource is allocated to at the data and time value that is currently being processed. The resulting quotients are summed over the resources in set R, and the resulting sums are stored as values in the Operator_Loading array 410 for the operator in question.

Referring once more to FIG. 3, at 306 the system presents to a user, at the user's request, resource and/or operator loading profile data that was generated at 304. At the user's option, and in some embodiments, the loading profile presented may be for one or more of (i) a single resource, (ii) a single operator, (iii) an organizational group (e.g., the entire factory, or a department, unit or cell included in a factory), (iv) a process group (e.g., a group of resources of the same capability, such as all milling machines, or a virtual group defined by the user or predefined in the system), and (v) a task group (all resource allocated to a single task).

Each loading profile may be defined by combining stochastic task profiles that represent the probability that a given task is in production on a given resource at a given time. At the user's request, a graphic display page may be generated by the server and may be presented to the user on a display monitor (not separately shown) of one of the client computers. The particular graphic display page may be defined in terms of one or more of the following parameters entered by the user: (i) time period of interest, (ii) resolution of time scale (e.g., by minute, by hour, by day), (iii) the resource, or resource group, for which loading profile information is to be presented, (iv) calendar options (e.g., whether to include or exclude weekends), and (v) Boolean settings for one or more of (a) resource overload periods, (b) operator overload periods, (c) indication of reserved resource capacity, (d) probability of overload, and (e) indications of minimum and maximum values of loading profiles.

Figure 6:
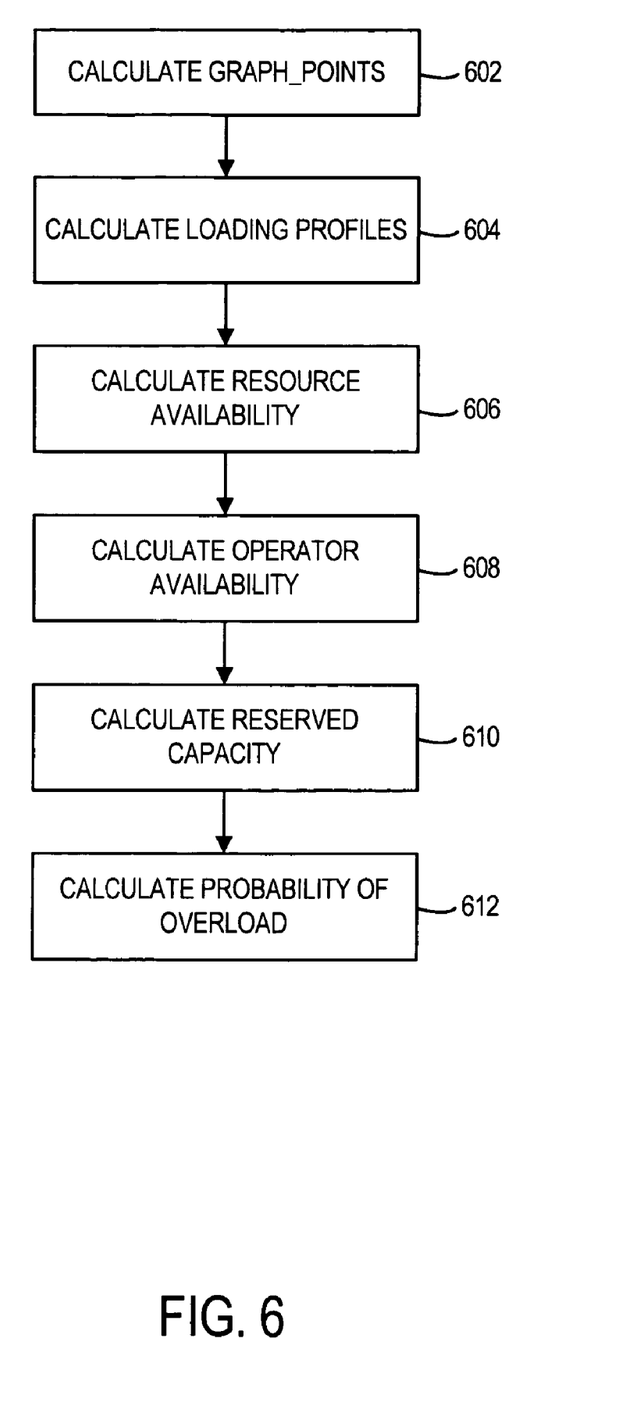
FIG. 6 is a flow chart that illustrates some details of the process of FIG. 3.

FIG. 6 is a flow chart that illustrates a pre-process performed as part of step 306 of FIG. 3 in preparation for generating the graphic display page requested by the user. The process of FIG. 6 pre-processes each graph sample point for the graphic display page prior to the initial display of the graphic display page and prior to each update of the graphic display page when the user selects another resource or resource group, selects another time period, or otherwise changes a parameter of the requested loading profile information.

At 602 in FIG. 6, an instantiation of an object class referred to as a "Graph_Point" is generated for each time interval according to the resolution selected by the user (e.g., each hour), starting with the starting time of the period of interest and ending with the ending time of the period of interest, and taking into consideration calendar options selected by the user. The Graph_Point object class inherits the parameters from the class Date_Time_Value. The values for the parameters for each instantiation of the Graph_Point class are copied from the array list 402 (FIG. 4) for the instantiation of the Date_Time_Value class that is nearest in time to the Graph_Point instantiation in question.

At 604 in FIG. 6, the minimum, maximum and most likely values are calculated (or otherwise derived) for the loading profile for the selected resource or resource group. The resulting values are stored in a loading array for each Graph_Point instantiation.

In the case where a single resource has been selected by the user, the values are copied from the Resource_Loading array 412 (FIG. 4) for the resource in question.

In the case where a single operator has been selected by the user, the values are copied from the Operator_Loading array 410 for the operator in question.

In the case where an organizational group has been selected by the user, the values in the Resource_Loading arrays 412 are summed over the resources in the organizational group.

In the case where a process group has been selected by the user, the values in the Resource_Loading arrays 412 are summed over the resources in the process group.

In the case where a task group has been selected by the user, the values in the Resource_Loading arrays 412 are multiplied, in the case of each resource allocated to the task in question, by the probability that the resource is allocated to the task, and the resulting products are summed.

At 606 in FIG. 6, the availability of a resource or resource is calculated or otherwise derived.

In the case where a single resource has been selected by the user, a previously established availability (e.g., one shift of 8 hours per day) for the resource in question is retrieved.

In the case where an organizational group has been selected by the user, the availabilities for operation of all of the resources in the group are summed (e.g., to produce a figure such as 48 hours per day).

In the case where a process group has been selected by the user, the availabilities for operation of all the resources in the group are summed.

In the case where a task group has been selected by the user, the availability for each resource possibly allocated to the task is multiplied by the probability of allocation to the task, and the resulting products are summed.

In the case where the user has selected a single operator, no calculation or derivation of resource availability is performed.

At 608 in FIG. 6, the availability of an operator is calculated or otherwise derived.

In the case where a single resource has been selected by the user, the total availability for operation of the operators allocated to the resource in question is divided by the percentage of operator assistance allocated to the resource in question to produce a value $A_{res}$.

In the case where a single operator has been selected by the user, a previously established availability (e.g., one shift of 8 hours per day) for the operator in question is retrieved.

In the case where an organizational group has been selected by the user, the values $A_{res}$ (calculated as indicated above) for each resource are summed over all the resources in the organizational group.

In the case where a process group has been selected by the user, the values $A_{res}$ (calculated as indicated above) for each resource are summed over all the resources in the process group.

In the case where a task group has been selected by the user, the value $A_{res}$ (as calculated above) for each resource possibly allocated to the task is multiplied by the probability of allocation to the task, and the resulting products are summed.

At 610 in FIG. 6, a reserved capacity is calculated. This is done by estimating, on the basis of historical trend data, how much capacity is likely to be required, although not yet known to be required, to produce orders not yet known or not yet confirmed.

At 612 in FIG. 6, the probability of an overload is calculated for the resource, operator or resource group selected by the user, taking into consideration both operator and resource constraints. The overload probability calculation is performed by taking the minimum, most likely, and maximum values calculated or derived at 604 for the resource or resource group selected by the user and fitting a distribution (e.g., a triangular distribution) over these values. The probability that the load is greater than either the maximum availability of resources (calculated or derived at 606) or the maximum availability of operators (calculated at 608) is then calculated. If the user so elects, the maximum availability can be adjusted by taking the reserved capacity (estimated at 610) into consideration.

In some embodiments, the overload probability may be calculated according to a procedure described by the following pseudo code representation:

If the minimum loading value (MINLV) is larger than the maximum availability (MA), the probability of overload is 100%

Else if the maximum loading value (MAXLV) is smaller than the maximum availability, the probability of overload is 0%

Else if the most likely loading (MLLV) is larger than the maximum availability, the probability of overload is:

$$((MA-MINLV)*(MA-MINLV))/((MAXLV-MINLV)*(MLLV-MINLV))$$

Else the probability of overload is:

$$1-((MAXLV-MA)*(MAXLV-MA))/((MAXLV-MINLV)*(MAXLV-MLLV))$$

Figure 7:
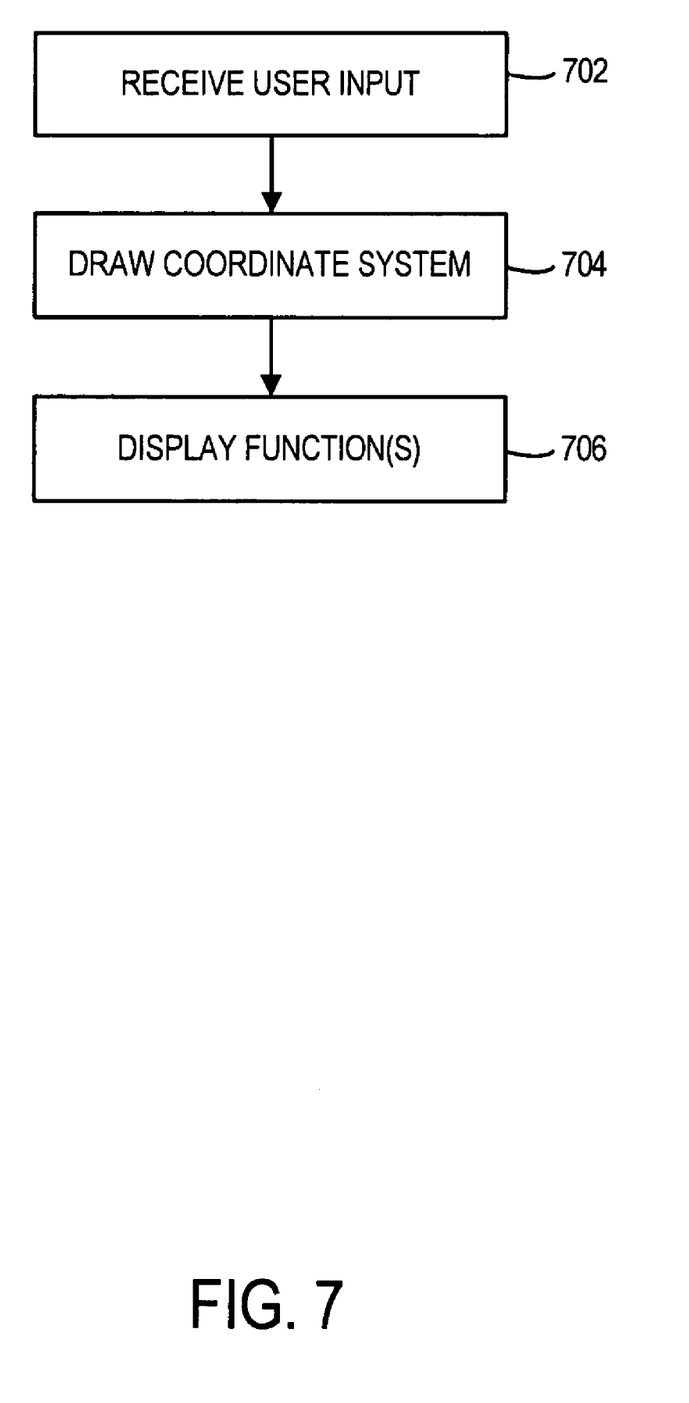
FIG. 7 is a flow chart that illustrates some details of the process of FIG. 3.

FIG. 7 is a flow chart that illustrates a process for displaying a graphic display page as part of step 306 in FIG. 3.

At 702 in FIG. 7, the system receives a user input, such as a "draw" or "paint" command. (It will be appreciated that the user may have previously provided user input to define the parameters of a desired graphic display page, as described above.) At 704 in FIG. 7, the system draws a coordinate system with the appropriate range of date and time values for the period of interest indicated on a horizontal axis. One or more vertical axes may also be displayed to show, e.g., capacity used and available, or probability of overload.

At 706, one or more functions, such as availability, loading and/or probability of overload, are presented to the user as graph curves and/or fields in a graphic display page.

Figure 8:
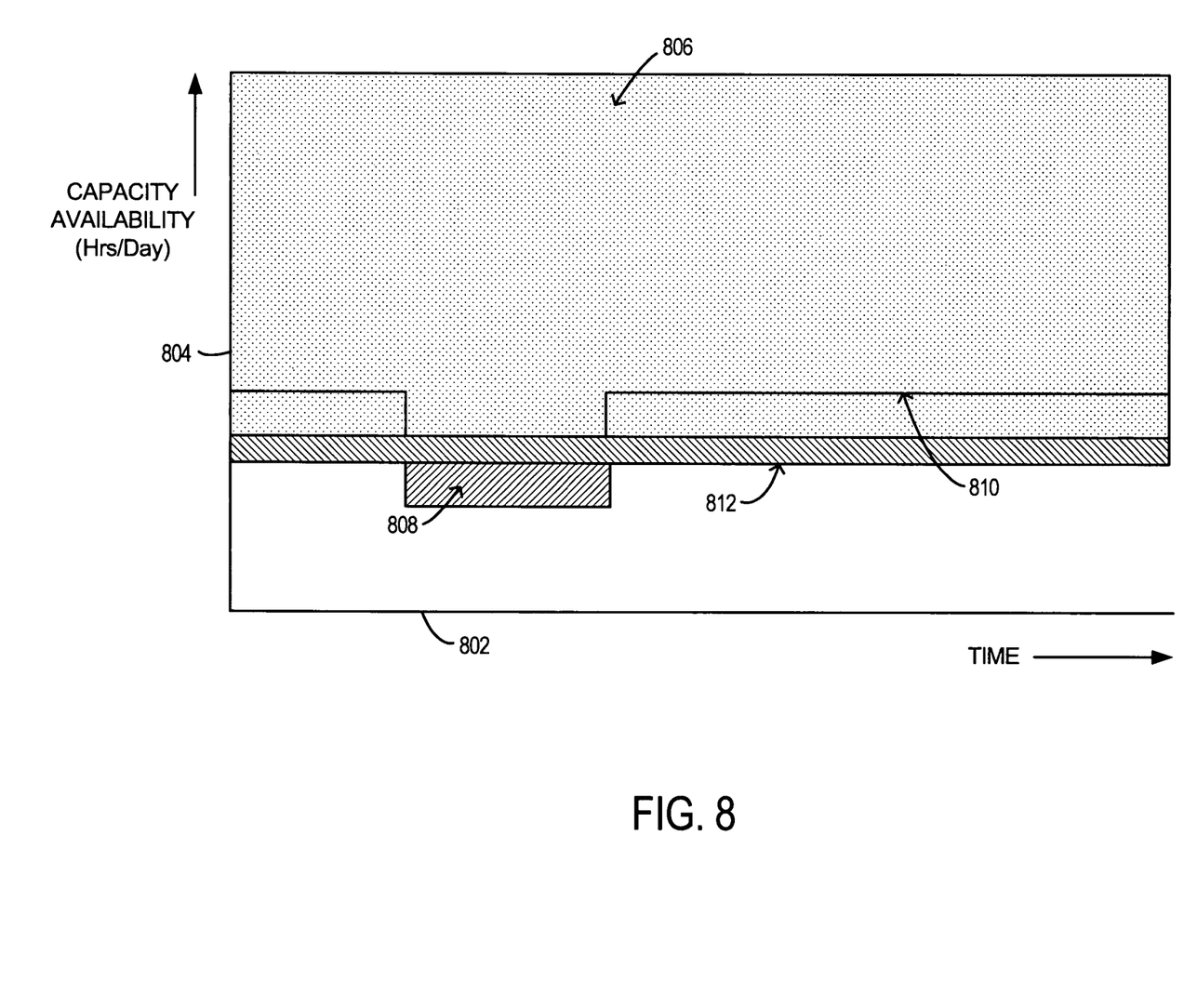
FIG. 8 shows at least a portion of a graphic display page that may be provided in connection with the process of FIG. 3.

FIG. 8 is a graph that shows at least some elements that may be included in a graphic display page in accordance with some embodiments. Reference numeral 802 in FIG. 8 indicates a horizontal axis which corresponds to the passage of time. Although not shown in the drawing, the horizontal axis 802 may be indexed with points that correspond to the time and date values which make up the period of interest which the graphic display page represents. For example, the horizontal axis may be divided into intervals which each correspond to a working hour.

Reference numeral 804 indicates a vertical axis which may be scaled (not shown in the drawing) to represent the number of hours that a resource/resource group/operator is available. Thus a scale of 24 hours may be presented on the vertical axis 804, for example.

Reference numeral 806 indicates a dot-shaded region which represents a "resource overload area", i.e., a proportion of each time interval during which the resource selected by the user is not available. Reference numeral 808 indicates a hashed region which represents an "operator overload area", i.e., a proportion of each time interval during which an operator is not available even though the resource in question is available. Reference numeral 810 indicates a line which may pass through the resource overload area 806 to indicate an extent to which there is greater availability of an operator or operators than availability of the resource in question. Reference numeral 812 indicates a hashed region which represents a degree to which the resource availability is considered to be "reserved capacity".

Figure 9:
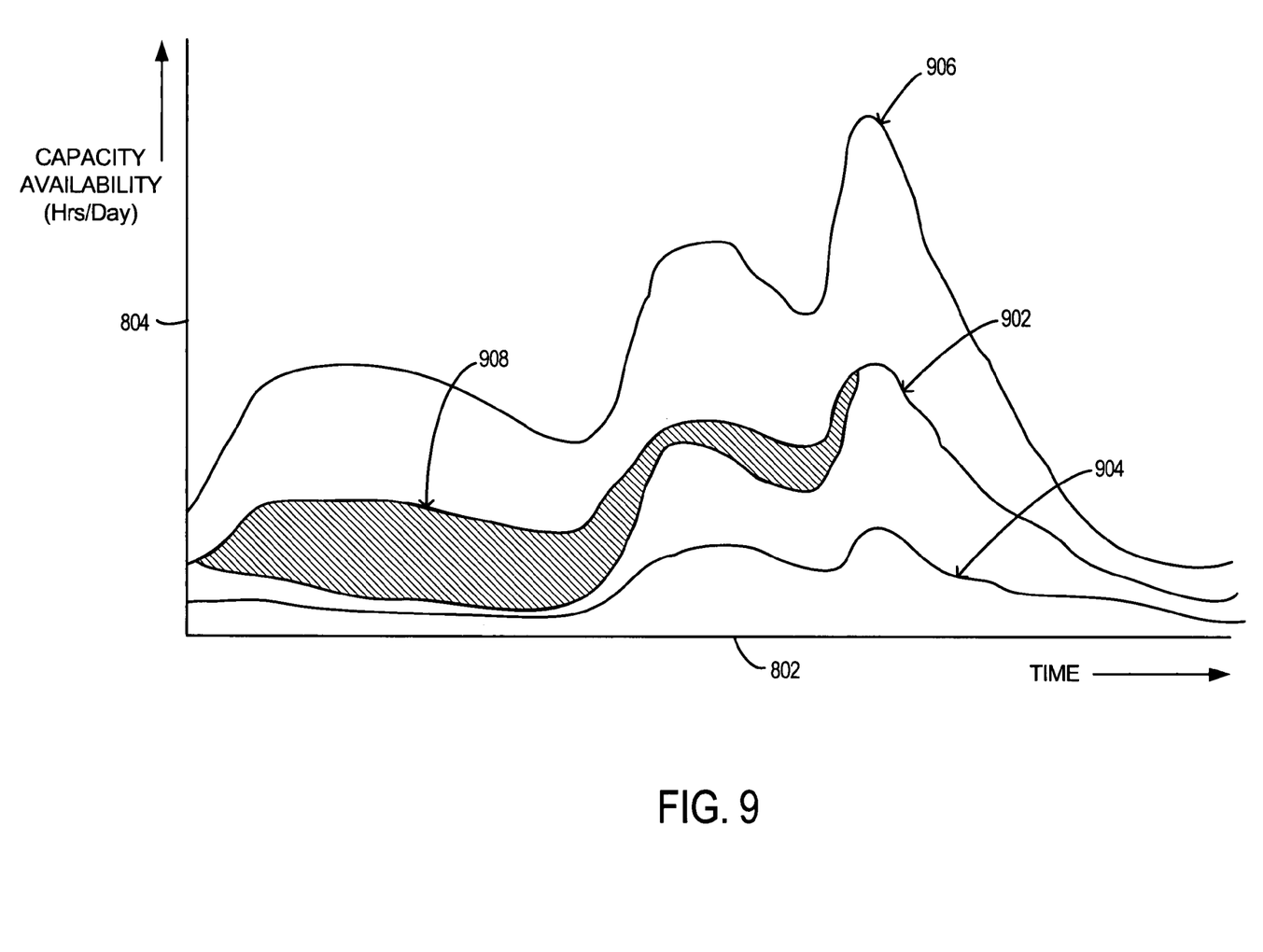
FIG. 9 shows at least a portion of a graphic display page that may be provided in connection with the process of FIG. 3.

FIG. 9 is a graph that shows some other or additional elements that may be included in a graphic display page in accordance with some embodiments. The graph shown in FIG. 9 may have the same horizontal and vertical axes 802, 804 as described above in connection with FIG. 8. Reference numeral 902 indicates a graph curve that represents the most likely values for the loading profile function for the resource selected by the user. Reference numeral 904 indicates a graph curve that represents the minimum values for the loading profile function for the resource in question. Reference numeral 906 indicates a graph curve that represents the maximum values for the loading profile function for the resource in question. In the case where the user has selected a task group for display of its loading profile, the contribution of the task in question to the most likely loading profile is represented by the hashed region indicated by reference numeral 908.

Figure 10:
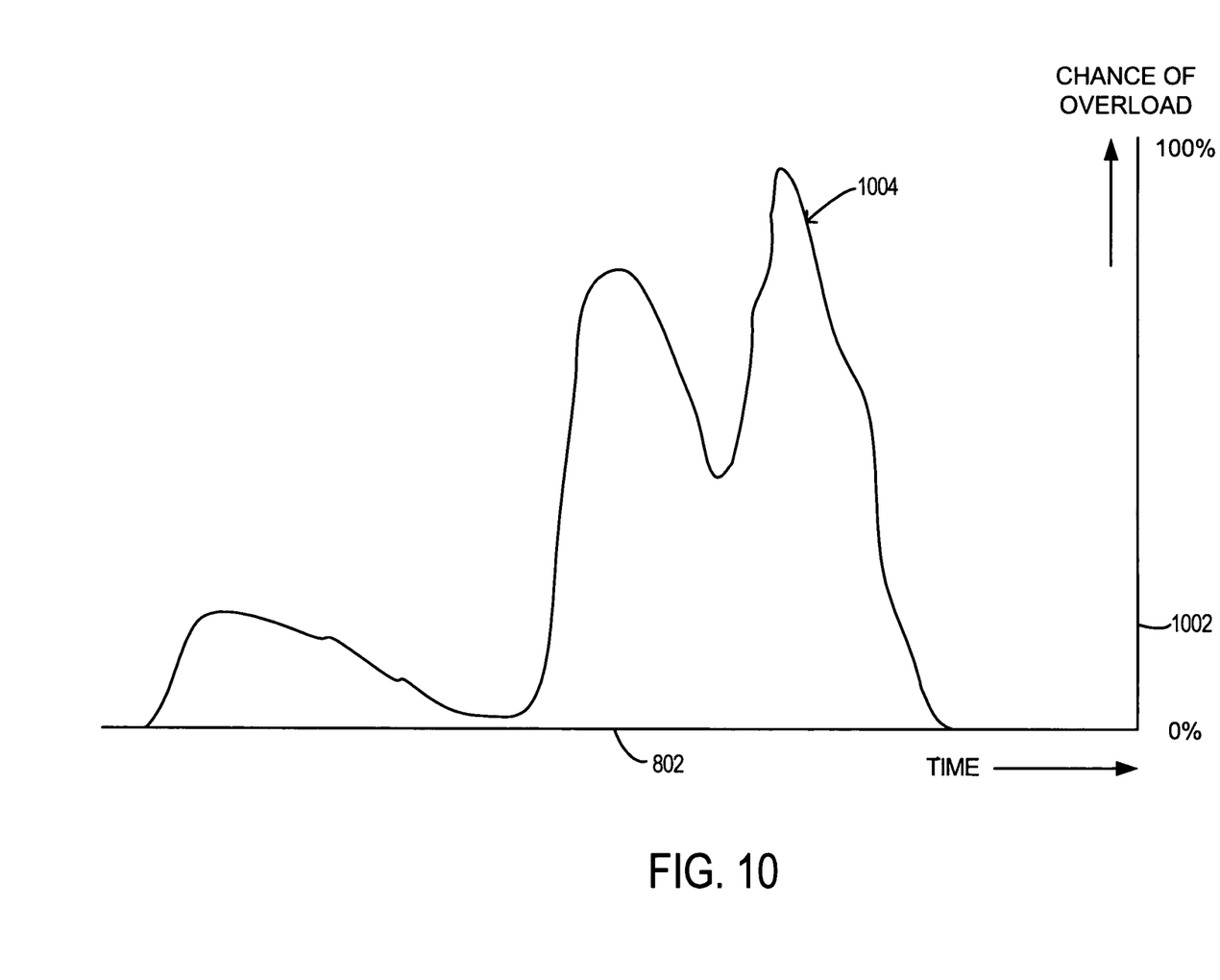
FIG. 10 shows at least a portion of a graphic display page that may be provided in connection with the process of FIG. 3.

FIG. 10 is a graph that shows some other or additional elements that may be included in a graphic display page in accordance with some embodiments. The graph shown in FIG. 9 may have the same horizontal axis 802 as FIGS. 8 and 9. In addition, the graph may have a right-hand side vertical axis 1002, scaled to indicate percentages (up to 100%) that correspond to the probability of an overload. Reference numeral 1004 indicates a graph curve that represents an overload probability function (calculated at step 612, FIG. 6) for the resource selected by the user.

In some embodiments, some or all of the elements shown in FIGS. 8–10 may combined in a single graphic display page, by e.g. suitable use of contrasting colors and/or transparency. For example, the dot-shaded region 806 ("resource overload area") may be presented as a red-colored field. The hashed region 808 ("operator overload area) may be presented as a pink-colored field. The hashed region 812 (reserved capacity) may be presented as a gray-colored field. The line 810 (tracing operator availability limit in excess of resource availability) may be colored in pink as it traverses the resource overload area.

The area under the curve 902 (FIG. 9) may be presented as a blue-colored field (to represent the "most likely" loading profile), (a) except for the hashed area 908, which may be presented in green to represent the contribution of the task which defines the task group (assuming a task group was selected by the user), and (b) except for the extent to which the area under curve 902 overlaps the region 806, in which case transparency would result in a purple color to represent the overlap.

Graph curves 906 and 904 may both be presented in blue, to respectively represent the maximum and minimum loading profile functions. Graph curve 1004 may be presented in a dark red color to represent the overload probability function. The combined graph page, if appropriate, may have both vertical axes 804, 1002, in addition to the horizontal axis 802.

In some embodiments, the system may operate to allow the user to obtain additional information by interacting with the graphic display page. For example, by, e.g., double-clicking (with a mouse that is part of the client computer and controls a cursor—both mouse and cursor not shown) on a particular interval on the horizontal axis, the user may call up a menu to allow the user to access additional information concerning the corresponding time interval. Such information may include one or more of the following: (a) the exact date and time represented by the interval on the horizontal axis; (b) a sorted list of tasks having a probability greater than zero of being in execution on the selected resource at the selected date and time (these tasks contribute to the loading profile; the percentage of contribution of each task may also be displayed); (c) the names of operators for the resource group; (d) the specific resources in the resource group; (d) the names of operators who are qualified to operate each resource; (e) the names of operators assigned to operate each resource.

Referring once more to FIG. 3, after the user has examined one or more graphic display pages that he or she has requested, and considering one or more of the loading profiles and the overload probability function represented in the graphic display page(s), the user may react to potential overloads or other problems by providing input (as indicated at 308) to a production scheduling system to attempt to eliminate or reduce potential overloads. The resulting changes in the production plan are indicated at 310. After the scheduling changes, the loading profiles and overload functions may be recalculated and presented again to the user to allow him or her to evaluate whether the production plan changes have had the desired effect on the likelihood of overloading the factory resources.

In one embodiment, a triangular probability density function is used for many or all of the stochastic parameters, using the minimum, most likely and maximum parameter values. However, other density functions may be used, and in such cases the standard deviation may be used to determine the lower and upper bounds of the parameter values.

It should be understood that the above description and the appended flow charts are not meant to imply a fixed order of performing the process steps. Rather, in alternative embodiments, the process steps may be performed in any order that is practicable.

In some embodiments, the loading profile calculation and presentation and the overload function calculation and presentation described herein may be performed in a computing environment, such as a client computer, that is not a server computer.

The task data and the loading profile data may be stored in other ways besides the data storage structure illustrated in FIG. 4.

Although the system has been described in detail in the foregoing embodiments, it is to be understood that the descriptions have been provided for purposes of illustration only and that other variations both in form and detail can be made thereupon by those skilled in the art without departing from the spirit and scope of the invention, which is defined solely by the appended claims.

What is claimed is:

1. A method of analyzing a manufacturing system, the system including plurality of manufacturing resources, a set of orders being currently appointed for processing by the manufacturing system, each order of the set of orders requiring performance of at least one task, each task to be performed by at least a respective one of the manufacturing resources, the method comprising:

determining stochastic parameters for each task of said plurality of tasks;

calculating a loading profile function for at least one of said manufacturing resources that is allocated to at least one of said plurality of tasks, said loading profile function being a function of time and representing a probability that said each manufacturing resource is occupied at a given time, said calculating based at least in part on said stochastic parameters of said tasks; and displaying a graphic display page in which said loading profile function is displayed as a graph curve;

wherein;

said calculating a loading profile function includes calculating a most likely loading profile function, a minimum loading profile function and a maximum loading profile function for said each manufacturing resource; and said displaying includes including in said graphic display page a respective graph curve for each of said most likely loading profile function, said minimum loading profile function and said maximum loading profile function;

the method further comprising:
providing input to attempt to eliminate or reduce potential overloads indicated by said graph curves;

the method further comprising:
calculating an overload probability function for said each manufacturing resource;

and wherein said displaying includes including in said graphic display page a graph curve that represents said overload probability function.

2. A method according to claim 1, wherein said displaying includes including in said graphic display page a display element that indicates periods of time during which said manufacturing resource is not available for operation.

3. An apparatus for analyzing a manufacturing system, the system including a plurality of manufacturing resources, a set of orders being currently appointed for processing by the manufacturing system, each order of the set of orders requiring performance of at least one task, each task to be performed by at least a respective one of the manufacturing resources, the apparatus comprising:

a processor; and
a memory coupled to the processor and storing software instructions, said processor operative with said software instructions to:
determine stochastic parameters for each task of said plurality of tasks;
calculate a loading profile function for at least one of said manufacturing resources that is allocated to at least one of said plurality of tasks, said loading profile function being a function of time and representing a probability that said each manufacturing resource is occupied at a given time, said calculating based at least in part on said stochastic parameters of said tasks; and
display a graphic display page in which said loading profile function is displayed as a graph curve wherein:
said calculating a loading profile function includes calculating a most likely loading profile function, a minimum loading profile function and a maximum loading profile function for said each manufacturing resource; and
said displaying includes including in said graphic display page a respective graph curve for each of said most likely loading profile function, said minimum loading profile function and said maximum loading profile function;

said processor further operative with said software instructions to:
receive input to attempt to eliminate or reduce potential overloads indicated by said graph curves;
wherein said processor is further operative with said software instructions to:
calculate an overload probability function for said each manufacturing resource;
and wherein said displaying includes including in said graphic display page a graph curve that represents said overload probability function.

4. An apparatus according to claim 3 wherein at least some of the manufacturing resources are machine tools.

5. An apparatus according to claim 3 wherein at least some of the manufacturing resources are human operators of machine tools.

6. An apparatus for analyzing a manufacturing system, the system including a plurality of manufacturing resources, a set of orders being currently appointed for processing by the manufacturing system, each order of the set of orders requiring performance of at least one task, each task to be performed by at least a respective one of the manufacturing resources, the apparatus comprising:

means for determining stochastic parameters for each task of said plurality of tasks;
means for calculating a loading profile function for at least one of said manufacturing resources that is allocated to at least one of said plurality of tasks, said loading profile function being a function of time and representing a probability that said each manufacturing resource is occupied at a given time, said calculating based at least in part on said stochastic parameters of said tasks: and
means for displaying a graphic display page in which said loading profile function is displayed as a graph curve;

wherein;
said calculating a loading profile function includes calculating a most likely loading profile function, a minimum loading profile function and a maximum loading profile function for said each manufacturing resource; and
said displaying includes including in said graphic display page a respective graph curve for each of said most likely loading profile function, said minimum loading profile function and said maximum loading profile function;

said apparatus further comprising;
means for receiving input to attempt to eliminate or reduce potential overloads indicated by said graph curves;

the apparatus further comprising:
means for calculating an overload probability function for said each manufacturing resource;
and wherein said displaying includes including in said graphic display page a graph curve that represents said overload probability function;
wherein at least one of said means includes a processor executing a stored program.

* * * * *